United States Patent [19]
Fukuoka et al.

[11] Patent Number: 5,872,916
[45] Date of Patent: Feb. 16, 1999

[54] METHOD OF ARRANGING AND REMOVING USER ENVIRONMENT IN COMPUTER NETWORK

[75] Inventors: Yasuko Fukuoka, Yokosuka; Ken'ichi Akiyama, Yokohama, both of Japan

[73] Assignee: Hitachi, Ltd., Tokyo, Japan

[21] Appl. No.: 773,308

[22] Filed: Dec. 24, 1996

[30] Foreign Application Priority Data

Dec. 28, 1995 [JP] Japan ................................. 7-342227

[51] Int. Cl.[6] .................................................. G01F 11/00
[52] U.S. Cl. ................ 395/188.01; 395/653; 395/200.51
[58] Field of Search ............................. 395/186, 187.01, 395/188.01, 653, 200.33, 200.51; 707/9; 711/163, 164; 380/3, 4, 23, 25

[56] References Cited

U.S. PATENT DOCUMENTS

| | | | |
|---|---|---|---|
| 5,163,147 | 11/1992 | Orita | 395/600 |
| 5,335,346 | 8/1994 | Fabbio | 707/9 |

FOREIGN PATENT DOCUMENTS

0513484-A2  11/1992  European Pat. Off. .

OTHER PUBLICATIONS

Dialog Record 01345676 of PC week, v7, n6, p. 84(2), 12 Feb. 1990, Gerber, B. "CBIS Inc. Network–OS 6.3 B", Paragraph 2.

*Primary Examiner*—Robert W. Beausoliel, Jr.
*Assistant Examiner*—Scott T. Baderman
*Attorney, Agent, or Firm*—Antonelli, Terry, Stout & Kraus, LLP

[57] ABSTRACT

In a client/server system in which user environments for utilization of systems differ for individual systems, a user environment managing method permits a system manager or a user authorized for management to arrange/remove different user environments. In response to a user environment arranging/removing request by a user, a computer system constituting a user information managing system distributes to a plurality of sub-systems processing procedure files for user environment arrangement/removal and information pieces on individual users. On the basis of the distributed information pieces, user environment arrangement/removal is carried out for the plurality of sub-systems in parallel.

6 Claims, 8 Drawing Sheets

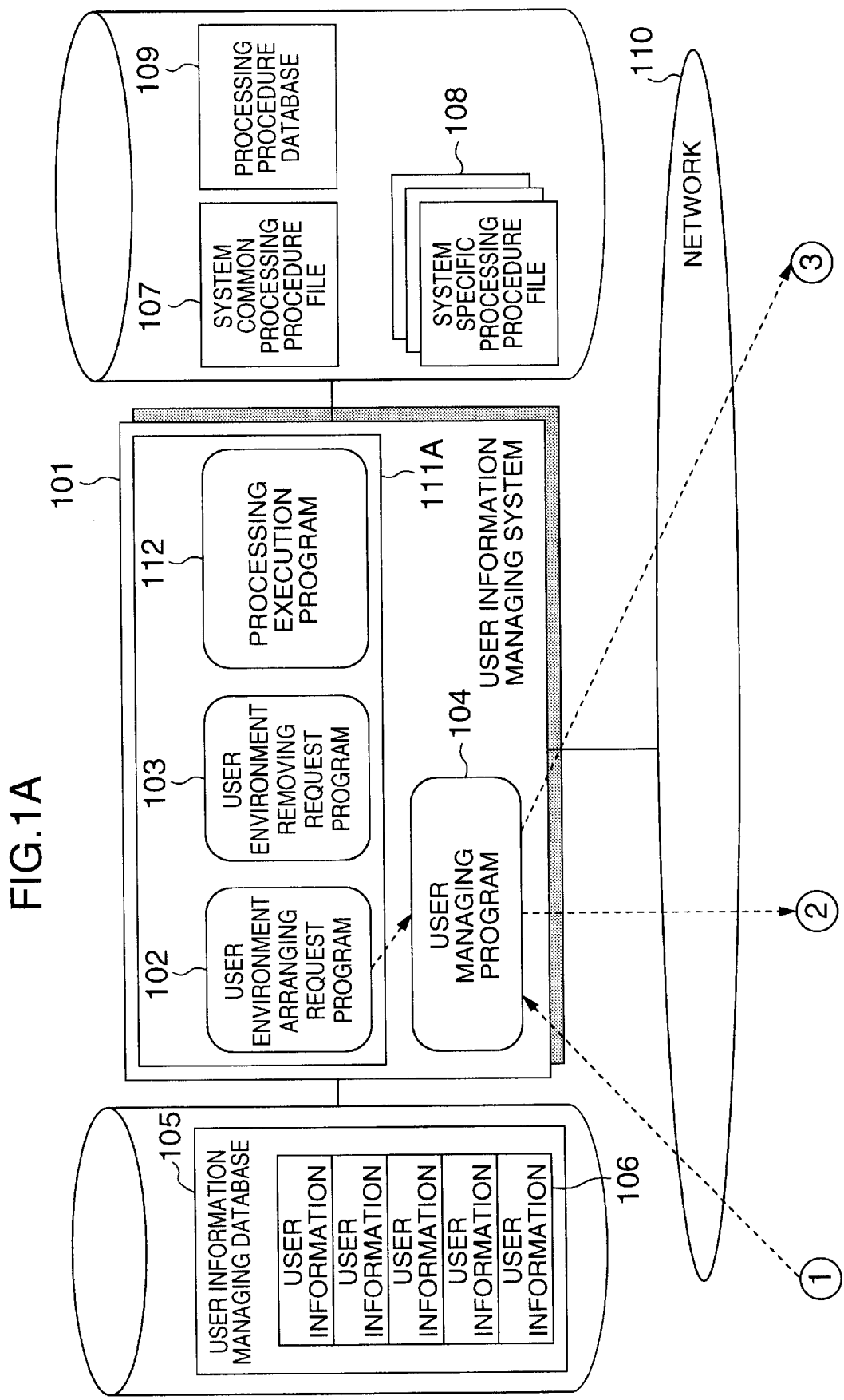

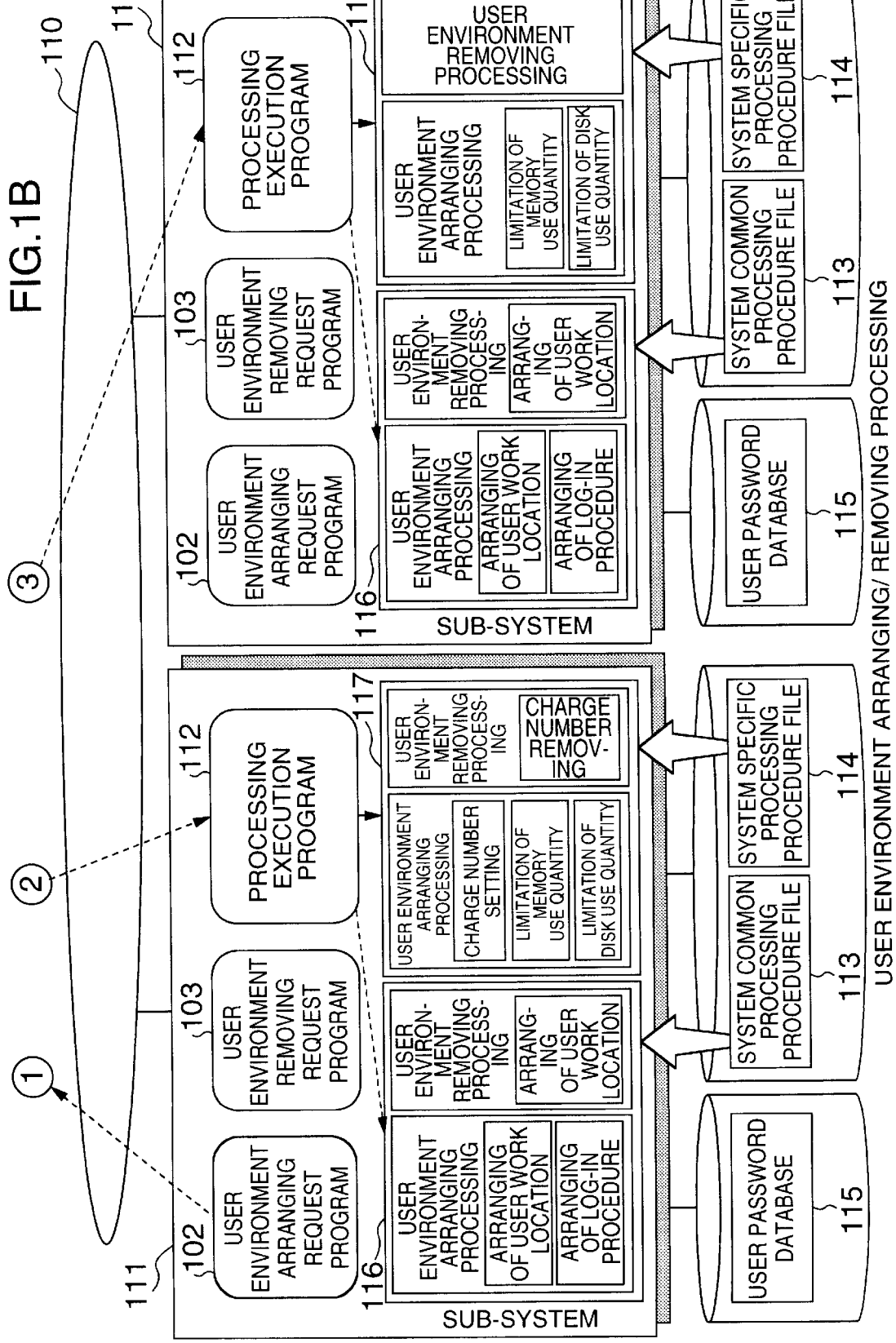

STRUCTURE OF USER INFORMATION
MANAGING DATABASE

FIG.3

PROCESSING PROCEDURE DATABASE

| SYSTEM SPECIFIC PROCESSING PROCEDURE A | SYSTEM A, SYSTEM B |
|---|---|
| SYSTEM SPECIFIC PROCESSING PROCEDURE B | SYSTEM C |
| SYSTEM SPECIFIC PROCESSING PROCEDURE C | SYSTEM D |

301     302

CONTENTS OF PROCESSING PROCEDURE DATABASE

FIG.4

USER PRSSWORD DATABASE

| USER A | PASSWORD | USER INFORMATION |
|---|---|---|
| USER B | PASSWORD | USER INFORMATION |
| USER C | PASSWORD | USER INFORMATION |
| USER D | PASSWORD | USER INFORMATION |

401   402     403

STRUCTURE OF USER PASSWOD DATABASE

PROCESSING OF USER ENVIRONMENT ARRANGING REQUEST PROGRAM

PROCESSING OF USER ENVIRONMENT
REMOVING REQUEST PROGRAM

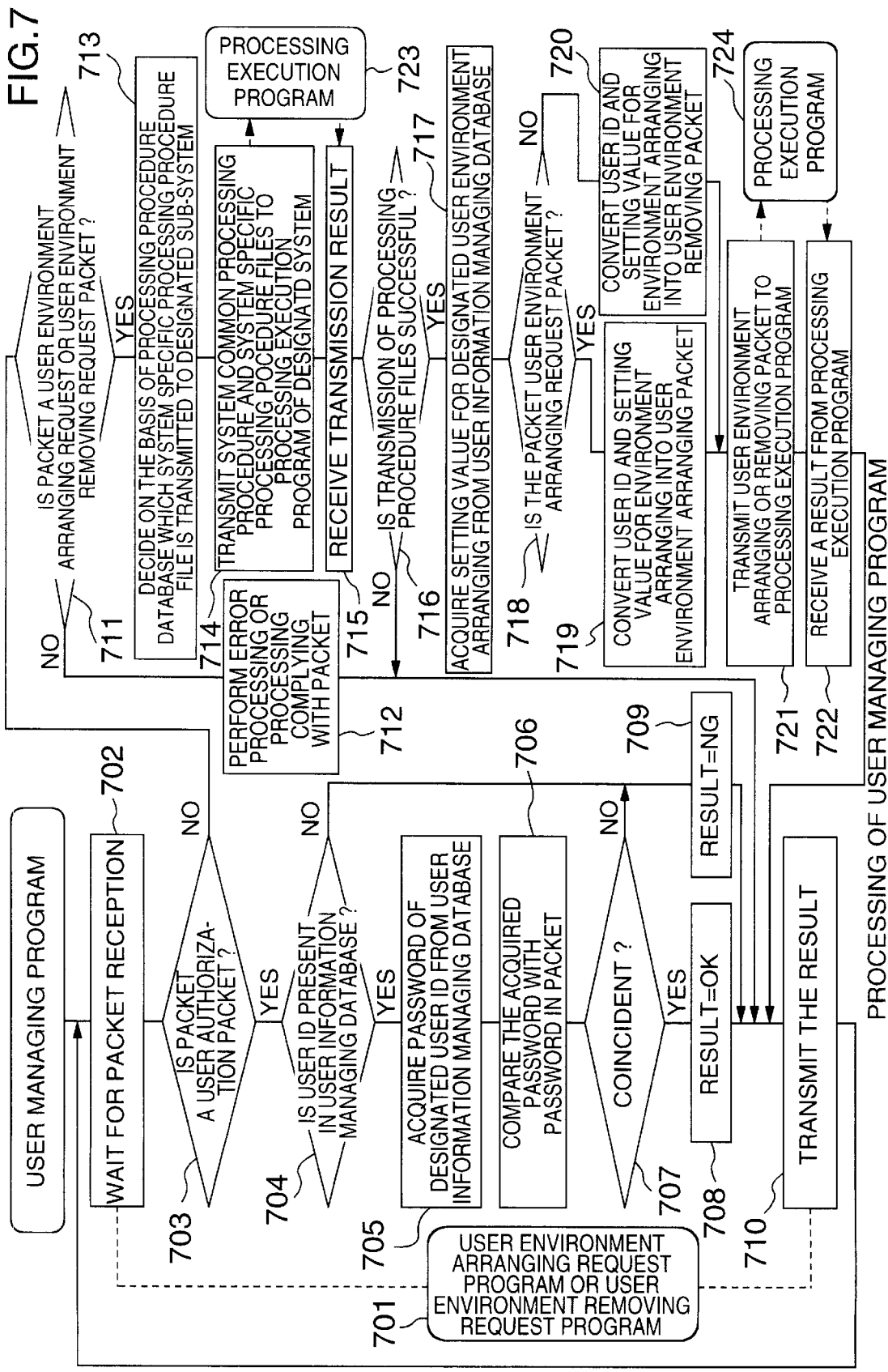

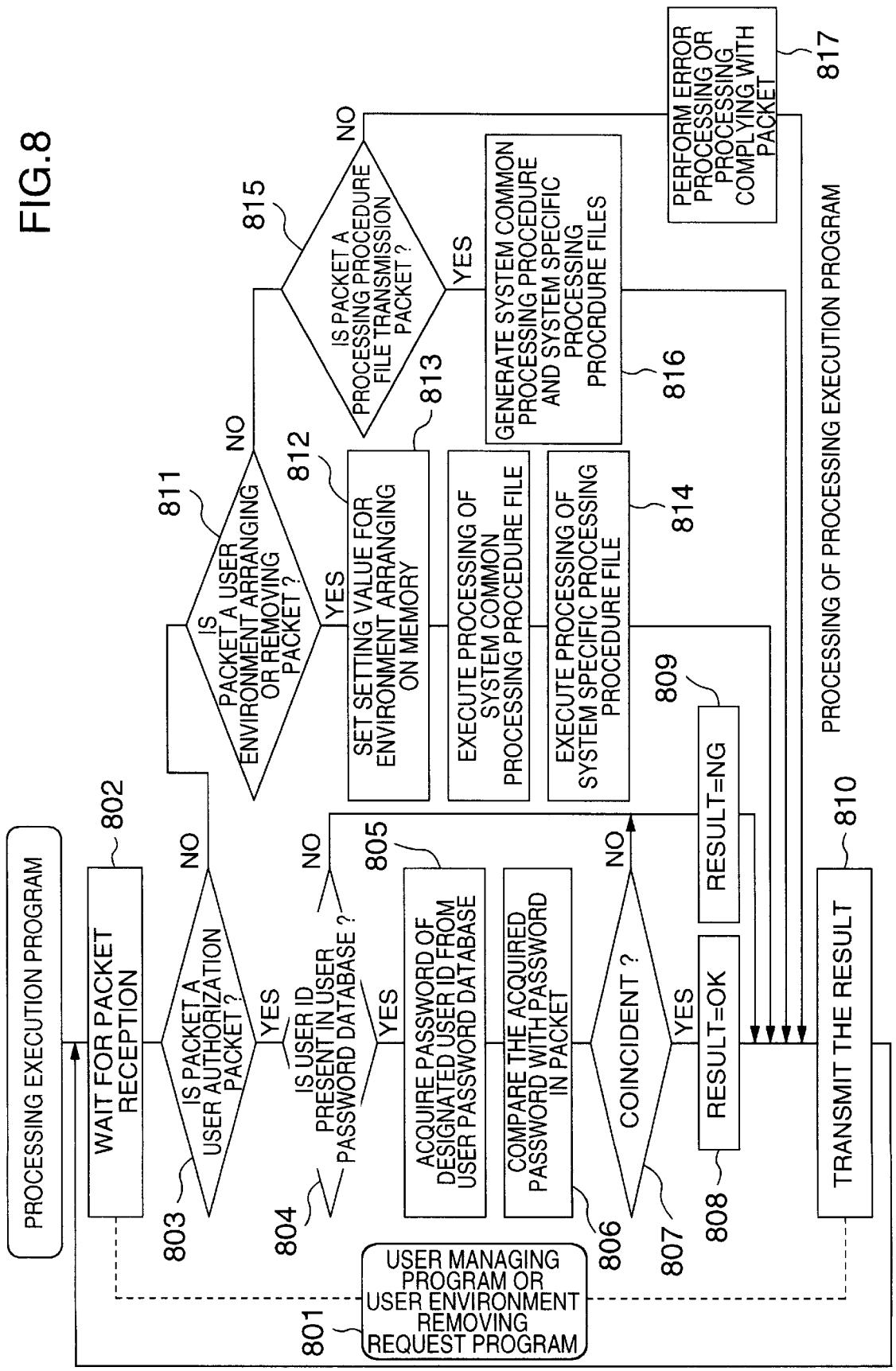

METHOD OF ARRANGING AND REMOVING USER ENVIRONMENT IN COMPUTER NETWORK

BACKGROUND OF THE INVENTION

The present invention relates to management of a user in a network dispersed environment, more particularly to a user environment managing method for arranging and/or removing a user environment.

In the case where a computer system including a database is placed in an environment in which the system is accessed by many users, it is frequent with the aim of protecting the system from being utilized by an unauthorized user that only a system manager is authorized to arrange or rearrange an environment necessary for a user to utilize the system. In this case, according to a conventional method, a user who wishes to utilize the system asks the system manager to arrange a user environment and the system manager engages in arrangement of the user environment. Similarly, when the utilization of the system ends, the user asks the system manager to remove the user environment and the asked system manager engages in removal of the user environment.

In recent years, a large-scale system configuration in which a plurality of systems are connected to each other through a network has been exemplified widely. In this type of system configuration, different user environments are often set up for individual systems, thus increasing the load of management work imposed on the system manager who arrange the user environments.

The aforementioned conventional method raises the problems as below.

(1) Since the user environment for utilization of system differs for individual systems, the system manager is required to perform the processing of arranging/removing user environments which differ for the individual systems and the work of user environment arranging/removing imposes a large load on the system manager who manages a plurality of systems.

(2) Since only the system manager is authorized to perform the processing of arranging/removing user environments, an ordinary user who wishes to start and end the utilization of a system must ask the system manager to arrange or remove a user environment.

SUMMARY OF THE INVENTION

An object of the present invention is to provide a method which can mitigate a load of management of user environment by the system manager.

Another object of the present invention is to provide user environment managing method and apparatus in a network dispersed environment which can permit a user per se to arrange or remove a user environment for system utilization complying with a user request.

To accomplish the above-objects, according to one mode of the present invention, user environments of a plurality of sub-systems are established and removed by one operation in a user information managing system in order that the work of user environment establishment and removal by the system manager is mitigated. The user environment establishing and removing processing is definable by dividing it into a processing procedure to be executed in all systems and a processing procedure to be executed in specified systems, and the processing procedures are distributed in the form of files to individual sub-systems and are executed on a sub-system of interest, thereby even the processing which differs for the individual systems can be dealt with. By managing information pieces for setting of environments of individual users stored in a user information managing database, environments which differ for the individual users can be established.

According to another mode of the present invention, in order to permit an ordinary user to arrange/remove a user environment, authorization of the user is effected by a user managing program on a user information managing system. Only when the authorization is successful, the user is permitted to establish/remove the user environment.

Other objects, features and advantages of the present invention will become apparent when reading the following detailed description of the preferred embodiments in conjunction with the accompanying drawings.

BRIEF DESCRIPTION OF THE DRAWINGS

FIGS. 1A and 1B as a whole, are conceptional diagram for explaining a user environment arranging/removing method according to an embodiment of the present invention.

FIG. 3 is a diagram for explaining a processing procedure database for managing which system a processing procedure file is distributed to.

FIG. 4 is a diagram for explaining a user password database used for authorization when a user logs in.

FIG. 7 is a flow chart showing the processing of a user managing program.

FIG. 8 is a flow chart showing the processing of a processing execution program.

DESCRIPTION OF THE PREFERRED EMBODIMENTS

Embodiments of the present invention will now be described with reference to the accompanying drawings.

Reference is made to FIG. 1 showing a conceptional diagram for explaining a method of arrangging/removing a user environment according to an embodiment of the present invention.

A user information managing system 101 including a CPU and a memory is connected to sub-systems 111 each including a CPU and a memory through a network 110 to form a client/server system.

Figure 2:
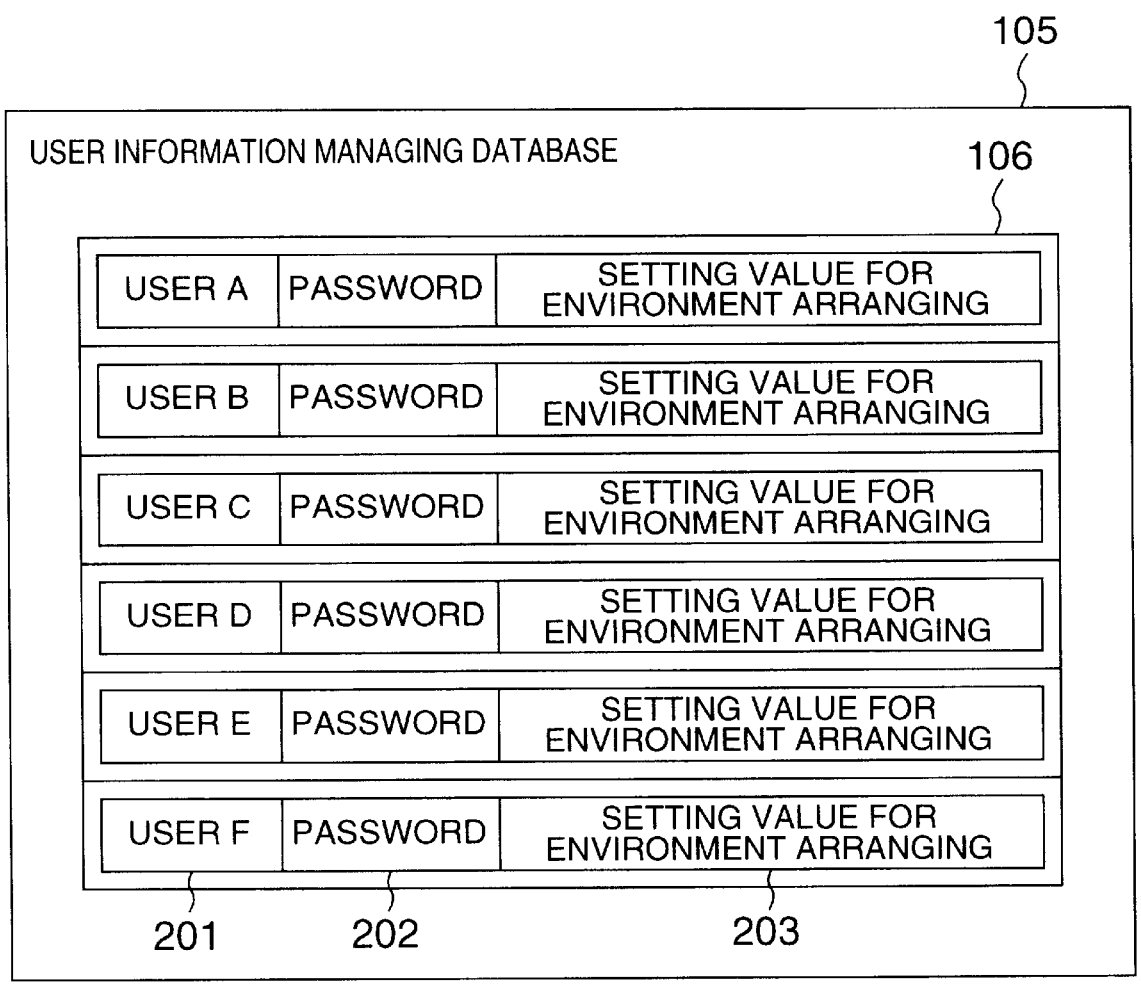
FIG. 2 is a diagram for explaining of a user information managing database which manages information pieces of individual users.

The user information managing system 101 includes: A) user information managing database 105 in which information pieces necessary for setting user environments are defined user by user, B) a user managing program 104 which manages a system common processing procedure file 107 for defining the user environment arranging/removing processing common to all sub-systems, C) system specific processing procedure files 108 for defining user environment arranging/removing processings specific to specified sub-systems 111, and D) processing procedure database 109 (FIG. 3) for defining destinations of distribution of the system specific processing procedure files 108 and a user information managing database 105 (FIG. 2) and which responds to a request from a user environment arranging request program 102 or from a user environment removing request program 103 to request a processing execution program 112 to remove or arrange a user environment. A section 111A comprised of the user environment arranging and removing request programs 102 and 103, the processing execution program 112 and the elements 113–117 (not shown) includes a CPU so as to fulfil the function of sub-system to be described later in addition to the user information managing function.

Like the user information managing system 101, each of the sub-systems 111 includes: A) user environment arranging request program 102 for requesting the user managing program 104 to arrange a user environment, B) a user environment removing request program 103 for requesting the user managing program 104 to remove a user environment, and C) a processing execution program 112 for executing the system common processing procedure file 107 and system specific processing procedure file 108 to perform the environment arranging and removing processing in the sub-system 111. Each sub-system 111 further includes a user password database 115 (FIG. 4) for defining a password used for authorization of a user who performs log-in. The user password database 115 is used upon user authorization during user environment removal.

Referring now to a flow chart of FIG. 5, the procedure of the user environment arranging processing will be described.

On the user information managing system 101 or a corresponding sub-system 111, a system manager or an ordinary user designates a user ID and a system name to cause the user environment arranging request program 102 to be executed. When the execution of the user environment arranging request program 102 is started by the ordinary user in step 501, the program executing sub-system requests the starter user to input a password of the designated user ID in step 502, prepares a user authorization request packet containing the user ID and the inputted password in step 503, and transmits the packet to the user managing program 104 of the user information managing system 101 in step 504. In the case where the executing user is the system manager in step 501, the authorization of the executing user need not be carried out and therefore steps 502 to 507 are passed by.

Referring now to FIG. 7, the processing of the user managing program will be described. The user managing program is started by the system manager in the user information managing system 101 and is resident in a virtual memory of the user information managing system.

The user managing program 104 receiving the user authorization packet from the user environment arranging request program 102 in step 703 determines, in step 704, whether the user ID in the user authorization packet is registered in the user information managing database 105 and if registered, the user managing program 104 compares in step 706 the password in the packet with a password 202 obtained from the user information managing database 105 in step 705. If the comparison result indicates coincidence in step 707, OK indicative of "authorized" in step 708 is returned to the user environment arranging request program 102 in step 710 but if non-coincidence is indicated in step 709, NG indicative of "unauthorized" is returned in the step 710.

Figure 5:
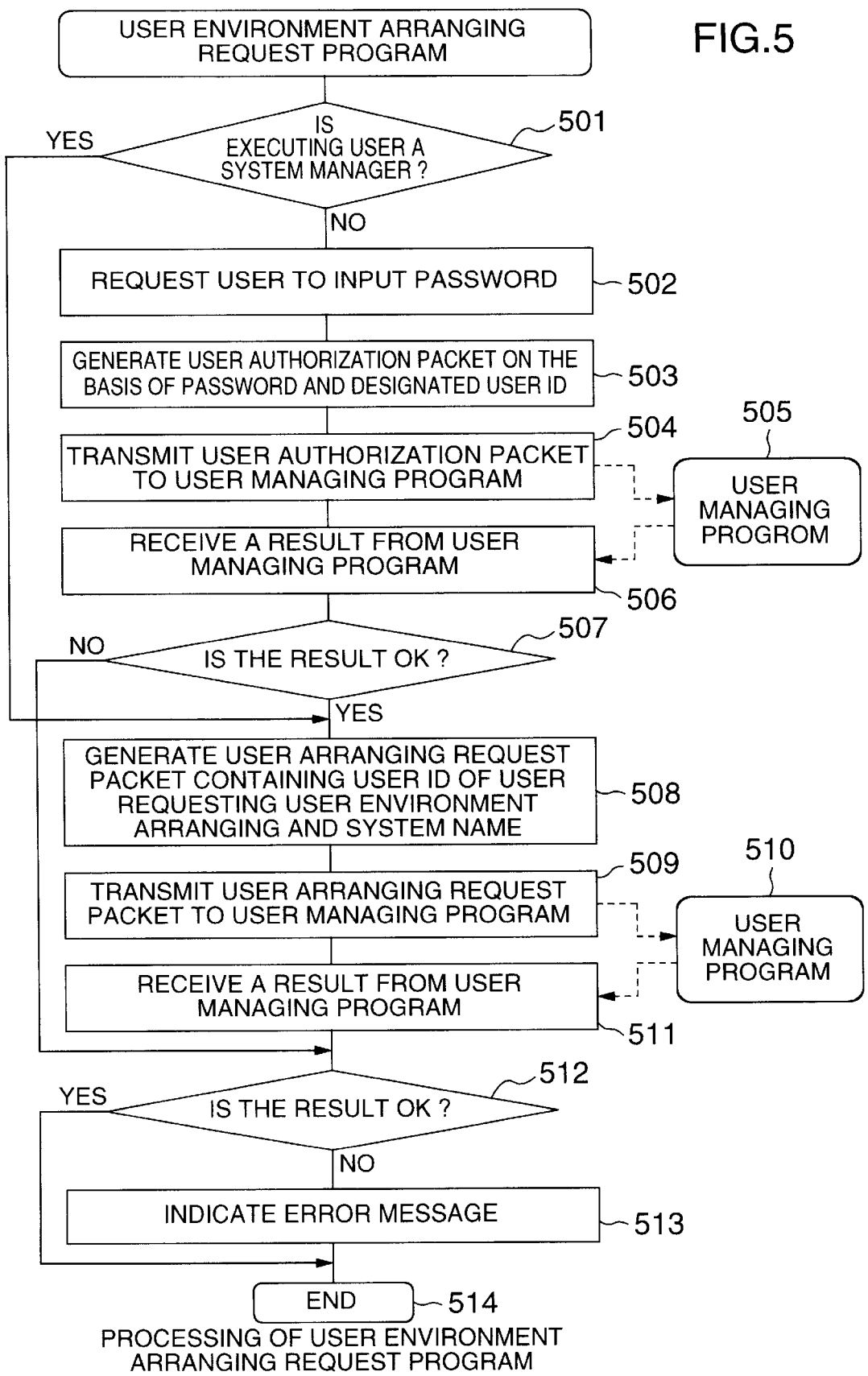
FIG. 5 is a flow chart showing the processing of a user environment arranging request program.

As shown in FIG. 5, the user environment arranging request program 102 receives the result of user authorization from the user managing program 104 in step 506 and when NG is returned from the user managing program 104 in step 507, the program 102 indicates an error message in step 513 and ends the processing in step 514.

When the executing user of the user environment arranging request program 102 is either the system manager or an authorized ordinary user in the steps 501 and 507, the user environment arranging request program 102 produces, in step 508, a user environment arranging request packet containing a user ID and a system name which requests arrangement of a user environment and transmits the produced packet to the user managing program 104 in step 509.

As shown in FIG. 7, the user managing program 104 receives the user environment arranging request packet in step 711 and transmits the system common processing procedure file 107 and a system specific processing procedure file 108 to the processing execution program 112 of the requesting sub-system 111 in step 714. In step 713, it depends on the definition by the processing procedure database 109 which one of the plurality of system specific processing procedure files 108 is distributed to which sub-system 111.

For example, in the processing procedure database of FIG. 3, a system specific processing procedure A 301 is distributed to systems A and B 302.

FIG. 8 shows in flow chart the processing of the processing execution program. The processing execution program is started by a system manager in a sub-system of interest and is resident in a virtual memory of the sub-system. The processing execution program 112 of the sub-system of interest places a received processing procedure file on disks 113 and 114 of the sub-system 111 in steps 815 and 816 and transmits a result in step 810.

When the transmittal of the processing procedure is successful in step 716, the user managing program 104 acquires setting values (or parameters) 203 for arrangement of an environment of the designated user ID from the user information managing database 105 in step 717, converts the acquired setting value into a user environment arranging packet in step 719 and transmits the packet to the processing execution program 112 of interest in step 721. The memory use quantity, the disk use quantity, the charged bill number and the like are included in the setting value.

When the processing execution program 112 receives the user environment arranging packet in step 811, it sets the setting value 203 for environment arranging on a memory of the sub-system of interest in step 812 and executes the processing defined in the system common processing procedure and system specific processing procedure files 113 and 114, which have already been distributed, by using the value set on the memory in steps 813 and 814. In the example shown in FIG. 1, assignment of user work location and preparation of log-in procedure are effected using the system common processing procedure file 116, and setting of the charged bill number carried out in different ways for individual sub-systems, limitation of the memory use quantity and limitation of the disk use quantity are effected using the system specific processing procedure file 117.

Figure 6:
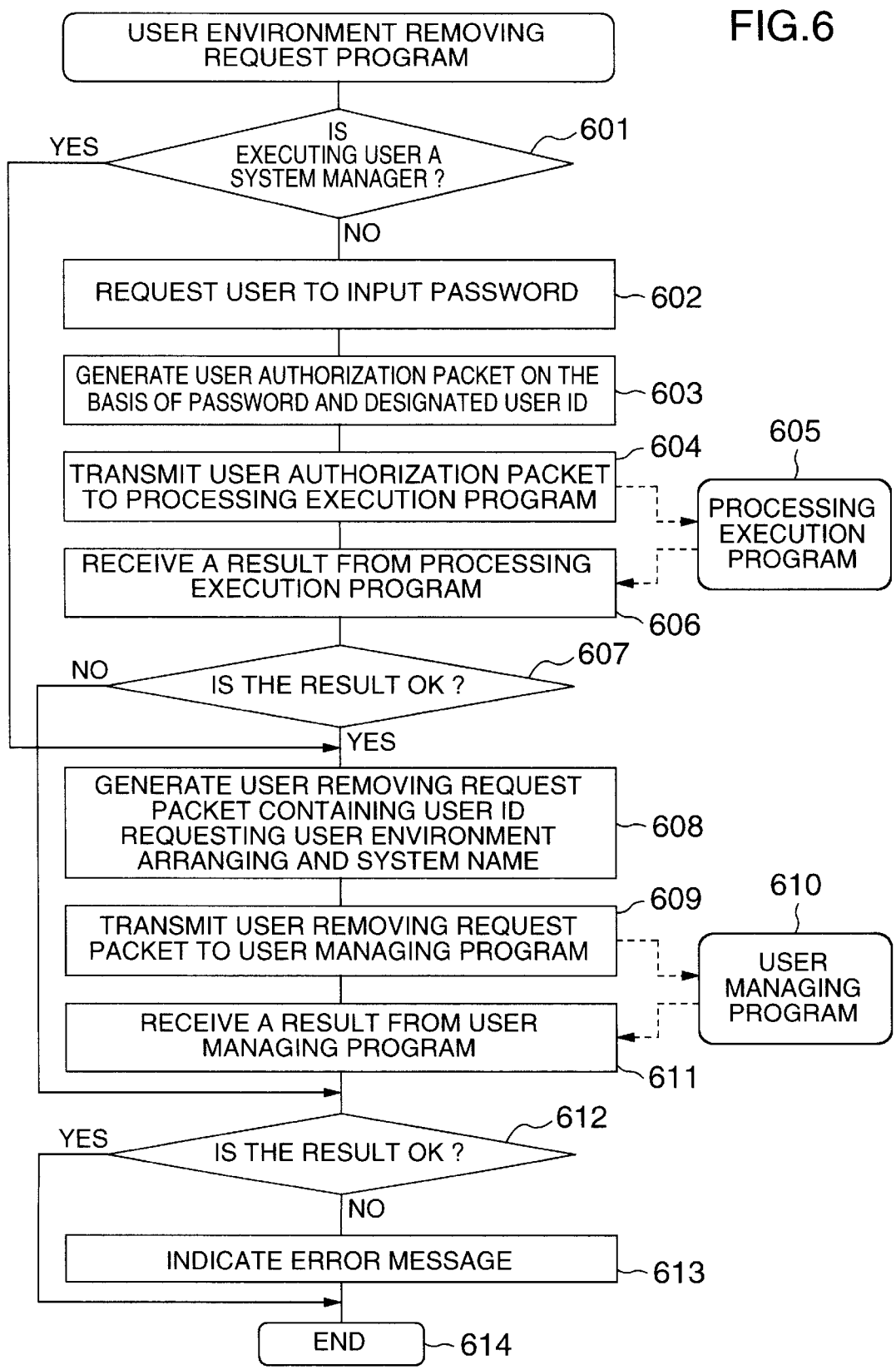
FIG. 6 is a flow chart showing the processing of a user environment removing request program.

Referring now to FIG. 6 and other Figures, a method for the user environment removing processing will be described.

On the user information managing system 101 or a sub-system 111, a system manager or an ordinary user cause the user environment removing request program 103 to be executed by designating a user ID who removes a user environment and a system name.

Referring to FIG. 6, when the user environment removing request program 103 is started by the ordinary user in step 601, the program executing sub-system requests the starter user to input a password of the designated ID in step 602, prepares a user authorization request packet containing the designated user ID and the inputted password in step 603 and transmits the packet to the processing execution program 112 of the designated sub-system 111 in step 609.

In the case where the executing user is the system manager in the step 601, the authorization of the executing user need not be carried out and therefore steps 602 to 607 are passed by.

The processing execution program 112 determines whether the received packet is a user authorization packet in step 803 and whether the user ID in the packet is registered in the user password database 115 in step 804 and if, in steps 806 and 807, the password in the packet coincides with a password 402 obtained from the user password database 115 in the step 805, the program 112 returns OK indicative of "authorized" in step 808 to the user environment removing request program 103 in the step 810 but if non-coincident, the program 112 returns NG in step 809 to the program 103 in the step 810. The user password database 115 includes user names 401, passwords 402 and user information pieces 403 and is used herein as a database of passwords for user authorization.

When NG is returned from the processing execution program 112 in step 607, the user environment removing request program 103 indicates an error message in step 613 and ends the processing in step 614.

In the case where the executing user of the user environment removing request program 103 is either the system manager or an ordinary user who succeeds in authorization, the user environment removing request program 103 generates a user environment removing request packet containing the user ID and a system name which requests removal of a user environment in step 608 and transmits the thus generated packet to the user managing program 104 in the step 609.

When the user managing program 104 receives the user environment removing request packet in the step 711, it transmits the system common processing procedure and system specific processing procedure files 107 and 108 to the processing execution program 112 of the requesting sub-system 111 in the step 714. In the step 713, it depends on the setting by the processing procedure database 109 which one of the plurality of system specific processing procedure files 108 is distributed to which sub-system 111.

The processing execution program 112 places the received processing procedure files 107 and 108 on disks of the sub-system 111 in the step 816 and transmits a result in the step 810.

When the transmittal of the processing procedure is successful in the step 716, the user managing program 104 acquires a setting value 203 for preparation of an environment from the user information managing database 105 in the step 717, converts the user ID into a user environment removing packet in step 720 and transmits the packet to the execution program 112 of interest in the step 721.

The processing execution program 112 receiving the user environment removing packet in the step 811 sets a setting value 203 for arrangement of an environment in the packet on a memory of the sub-system of interest in the step 812 and executes the processing defined in the system common processing procedure and system specific processing procedure files 113 and 114, which have already been distributed, by using the value set on the memory in the steps 813 and 814. In the example shown in FIG. 1, removal of user work location is effected using the system common processing procedure file 116 and removal of an item such as the charged bill number which is set in different ways for individual sub-systems is effected using the system specific processing procedure file 117.

The steps of the individual program processings disklosed in FIGS. 5 to 8 are programmed and stored in a recording medium such as a magnetic tape or disk. The user environment arranging request program, user environment removing request program, user managing program and processing execution program are commercialized as a product name "HI-OSF/1-MJ Multi-Host User Management System" by the present assignee and the above programs with the exception of the user managing program are commercialized as product names "JP1/Multi-Host User Management Client" and "JP1/Multi-Host User Management System/Client". The user managing program is commercially available as "JP1/Multi-Host User Management System".

According to the present invention, in a system configuration in which the plurality of sub-systems are connected to the user information managing system through the network, user environments in the plurality of sub-systems can be produced or removed through the network by executing the user environment managing program on a specified sub-system. Further, by taking advantage of the function of authorizing a starter of the program for user environment management, an ordinary user other than the system manager can be permitted to establish/remove a user environment.

We claim:

1. A method of arranging/removing user environments in a client/server system including: A) a computer system constituting a user information managing system having a user information managing database, where said computer system processes procedure files and said managing database for preparation/removing of user environments, B) a plurality of computer systems constituting sub-systems for which preparation/removing of user environments are carried out and C) a network for interconnecting said computer systems, said method comprising the steps of:

in response to a user request for environment arranging processing or a user request for environment removing processing by a user from a particular subsystem, causing said user information managing system to transfer to said particular sub-systems: 1) setting values for arrangement of environments of individual users which are held in the user information managing database, 2) a file of a system common processing procedure for defining the processings common to said sub-systems, and 3) files of system specific processing procedure for describing processings specific to specified sub-systems; and executing said distributed system common processing procedure and system specific processing procedure on the basis of the setting values in the particular subsystem; thereby arranging or removing environments of said user for the particular sub-system.

2. A user environment arranging/removing method according to claim 1 further comprising the steps of causing a user who is not authorized as a system manager for utilizing said sub-system to input a password of a user ID for user environment arranging/removing in response to a user environment arranging request or a user environment removing request issued by said user in said sub-system or user information managing system and performing authorization of said user request.

3. A user environment arranging/removing method according to claim 2 further comprising the steps of comparing said input password with a password stored in said user information managing database when said password inputted by said requesting user is for a user environment arranging request and comparing said input password with a password stored in a user password database of the sub-system, when said password inputted by said registering user is for a user environment removing request and performing arranging/removing of a user environment for a system for which said user requests the user environment arranging/removing only when a comparison result exhibits coincidence.

4. A user environment arranging/removing method according to claim 1, wherein said computer system constituting said user information managing system includes a sub-system for arranging/removing of user environments and operates in parallel with other sub-systems under the control of a user managing program.

5. A computer readable recording medium having computer readable instructions for implementing a user environment arranging/removing method which is used for system management of a client/server system including: A) a computer system constituting a user information managing system having a user information managing database, where said computer system processes procedure files and said managing database for preparation/removal of user environments, B) a plurality of computer systems constituting sub-systems for which arrangement/removal of user environments are carried out and C) a network for interconnecting said computer systems, said recording medium comprising:

a first plurality of said instructions constituting a program for distributing to each of said sub-systems: 1) a setting value for arrangement of an environment of each user which is held in a user information managing database on said user information managing system, said user information managing database being accessible by each user, 2) a file of a system common processing procedure for defining the processing common to all of said sub-systems, and 3) files of system specific processing procedure for describing the processing specific to each of said sub-systems; and a second plurality of said instructions constituting a program for executing said distributed system common processing procedure and system specific processing procedure on the basis of the setting value for environment arrangement inputted by a user of interest to perform user environment arrangement/removal for each of said sub-systems.

6. A computer readable recording medium according to claim 5 further comprising:

a third plurality of said instructions constituting a program for requesting a user who is not authorized as a system manager for utilizing said sub-system to input a password of a user ID for user environment arrangement/removal when said user executes the user environment preparing request processing or the user environment removing request processing in said sub-system or said user information managing system; and a fourth plurality of said instructions constituting a program for comparing the input password with a password stored in said user information database in the case of a user environment arranging request and comparing the input password with a password stored in a user password database in the case of a user environment removing request to perform user environment arrangement or removal for a system for which said user requests the user environment arrangement/removal only when a comparison result exhibits coincidence.

* * * * *